July 5, 1966
E. C. BROWN ETAL
3,259,257
MULTIPLE-PURPOSE FORK LIFT TRUCK
Filed June 12, 1964
3 Sheets-Sheet 1
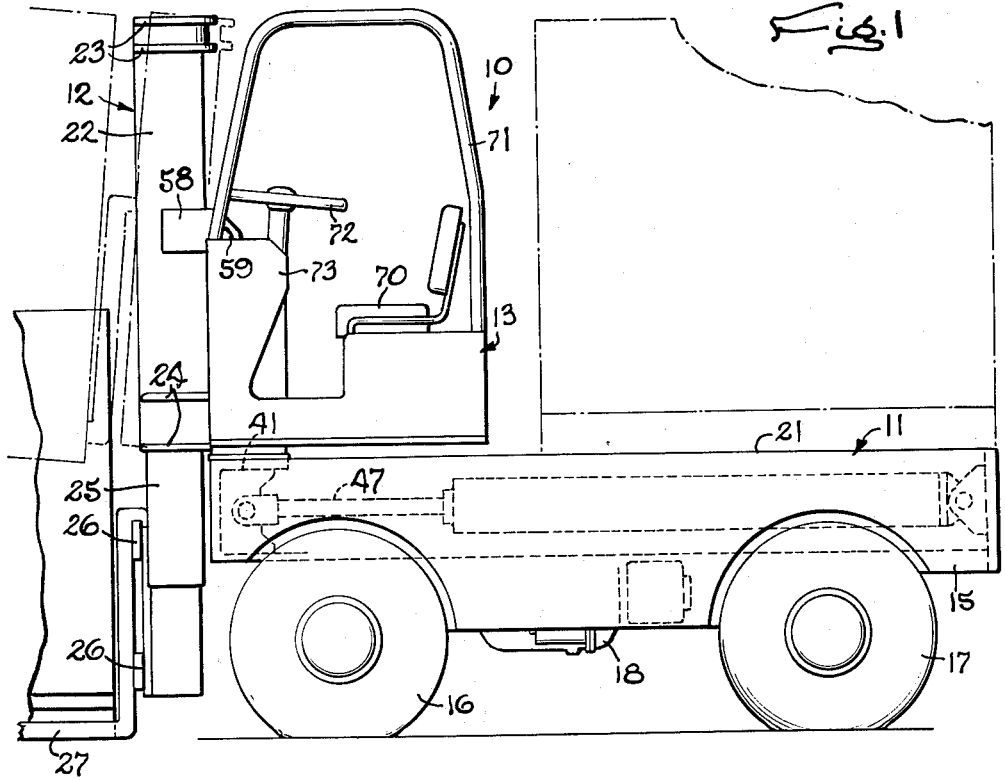
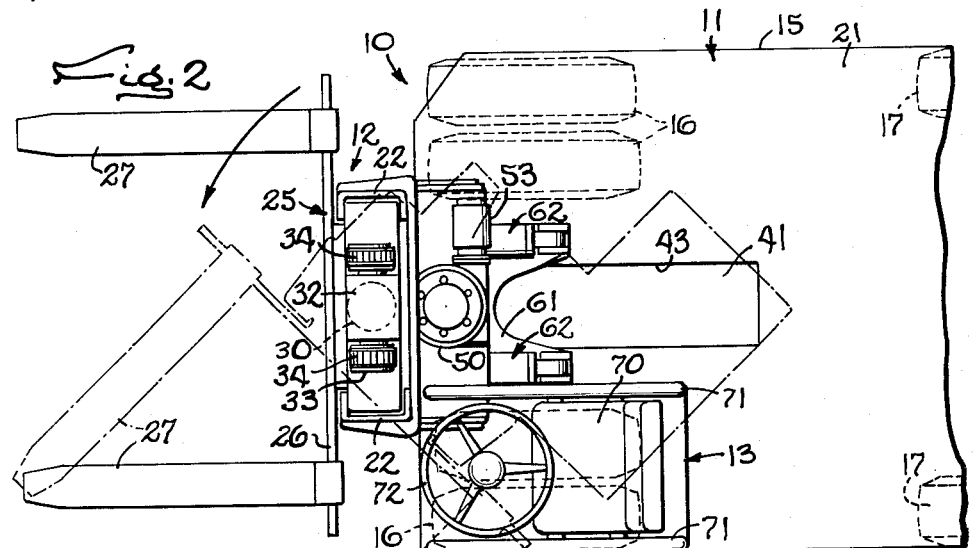
INVENTORS
Edwin C. Brown
Granville Woolman
Roy D. Brownell
ATTORNEY

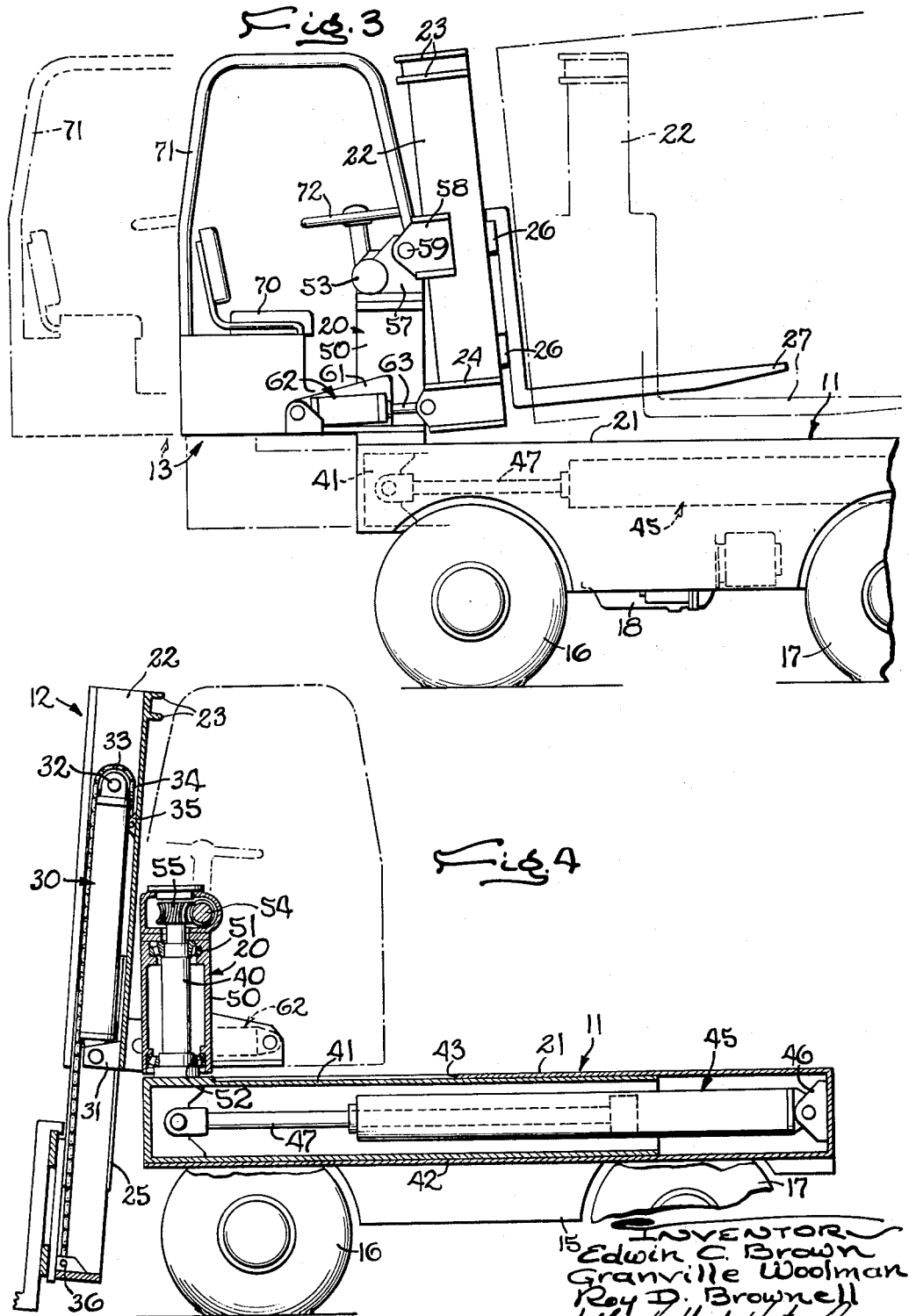

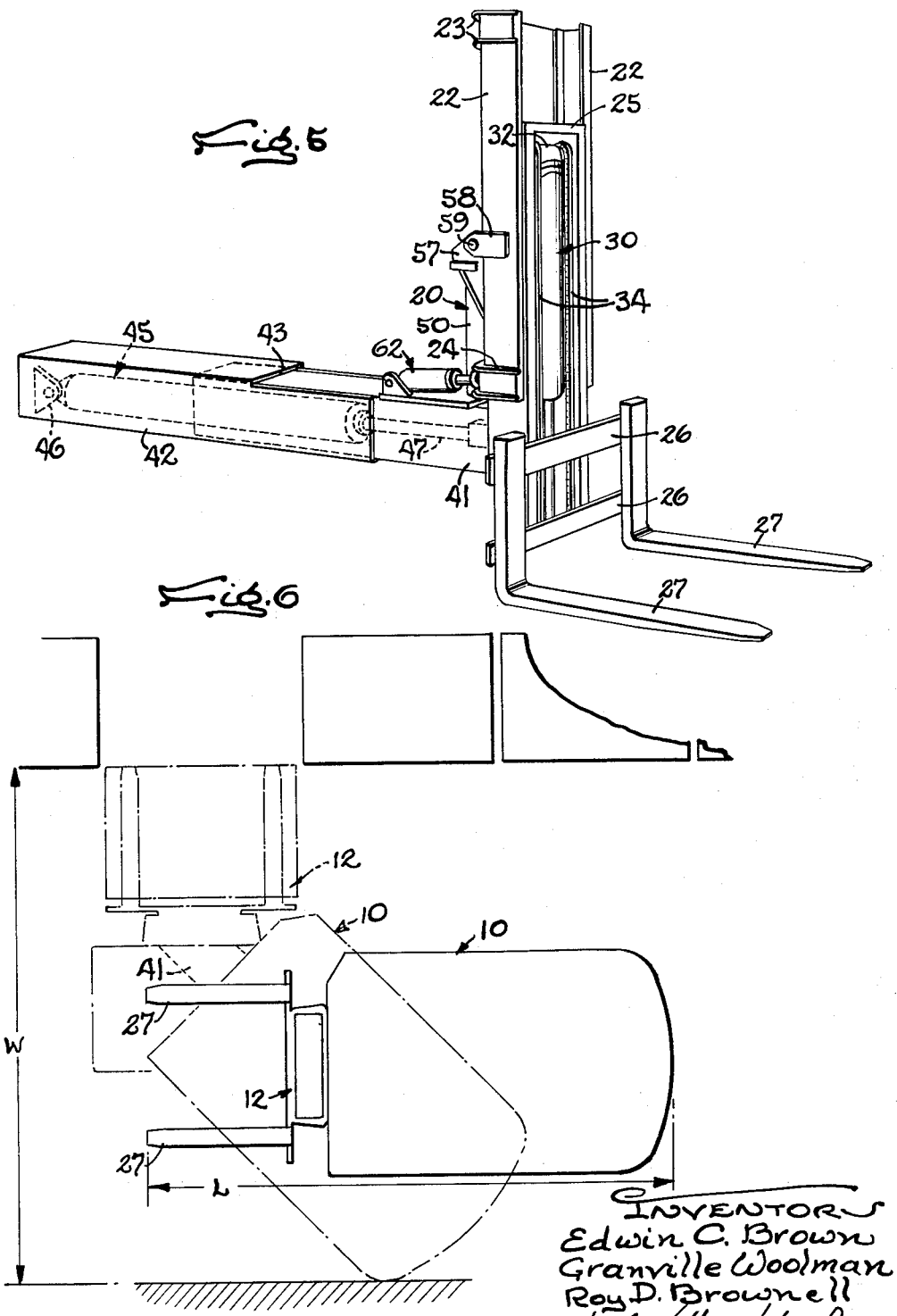

3,259,257
MULTIPLE-PURPOSE FORK LIFT TRUCK
Edwin C. Brown, Aurora, Granville Woolman, Naperville, and Roy D. Brownell, Aurora, Ill., assignors to Baldwin-Lima-Hamilton Corporation, a corporation of Pennsylvania
Filed June 12, 1964, Ser. No. 374,647
7 Claims. (Cl. 214—75)

This invention relates to materials handling vehicles and more particularly concerns an industrial type of fork lift truck.

It is an object of the invention to provide a novel fork lift type of load handling vehicle which has a self-loading capability allowing double loads to be carried, a plurality of small loads to be stacked onto the vehicle, and heavy loads to be transported in normal truck fashion centrally balanced on the vehicle. A collateral object is to provide a vehicle of the described type in which the fork and mast of the lift assembly have a range of linear movement and full 360° rotatability independent of, and relative to, the position of the vehicle chassis.

Another object is to provide a vehicle of the above kind which facilitates safe and convenient manipulation of a load in that the operator always faces the load with a clear view of the operation.

It is also an object to provide a vehicle as described above which permits placing loads at right angles to the center line of an aisle which can be slightly narrower in width than the normal overall length of the vehicle.

A further object is to provide a vehicle as characterized above that is compact and of basically simple design so as to be well suited for commercial manufacture, use and reliable heavy duty operation.

Other objects and advantages of the invention will be apparent upon reading the following detailed description and upon reference to the drawings, in which:

FIGURE 1 is an elevation of an industrial type fork lift truck embodying the present invention;

FIG. 2 is a fragmentary plan of the vehicle shown in FIG. 1;

FIG. 3 is a fragmentary elevation similar to FIG. 1 and showing the parts in a different operating position;

FIG. 4 is a fragmentary longitudinal section of the vehicle shown in FIG. 1;

FIG. 5 is a perspective showing some of the operating components of the vehicle illustrated in FIG. 1; and FIG. 6 is a diagrammatic plan showing one aspect of the operating capability of the vehicle illustrated in FIG. 1.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Turning first to FIGS. 1 and 2, there is shown an industrial type fork lift truck 10 embodying the invention and including a chassis 11, a mast assembly 12 and an operator's platform or station 13. Preferably, the chassis 11 includes a frame 15 supported on front dual drive wheels 16 and rear steerable wheels 17. The frame 15 mounts a power plant 18 embodying an internal combustion engine powering a hydraulic system that, in the preferred construction, includes a hydrostatic drive for the chassis wheels 16 and a charging pump supplying fluid under pressure for steering the rear wheels 17 and energizing a number of actuators referred to below. By utilizing the hydrostatic drive, the normal vehicle clutch, transmission and brakes are not required and equal forward and reverse speeds can be attained.

Pursuant to the invention, the mast assembly 12 and the operator's station 13 are mounted on a generally vertical column 20 (see also FIGS. 3–5) extending above what is otherwise an unobstructed, generally rectangular, flat, load carrying platform or deck 21 mounted on the top of the chassis frame 15. The mast 12 is preferably defined by a pair of opposed channels 22 held rigidly by upper and lower brace members 23 and 24, respectively. A subframe 25 is mounted for vertical sliding movement within the channels 22 and supports, at its lower end, cross bars 26 on which a pair of lift fork defining tines 27 are hooked. As is conventional, the tines 27 can be laterally adjusted by sliding them along the bars 26.

To raise and lower the tines 27, an actuator 30 is anchored on a bracket 31 secured to the brace member 24 so that the actuator lies within the subframe 25. The upper driven end 32 of the actuator 30 supports a pair of idler pulleys 33 about which are trained chains 34 anchored at 35 to the channels 22 and at 36 to the lower end of the subframe 25 (see FIG. 4). The pulleys 33 and the chains 34 act as a linear motion amplifying device so that energization of the actuator 30 to elevate the driven end 32 vertically positions the subframe 25 at twice the rate at which the actuator 30 is driven.

The mast channels 22 are positioned above the level of the deck 21 and the subframe 25 has a vertical range of movement, under the control of the actuator 30, sufficient to move the tines 27 from floor or ground level, shown in solid lines in FIG. 1, to an elevated position in which the tines are well above the level of the deck 21, as shown in full lines in FIG. 3 and in dashed lines in FIG. 1.

In accordance with the invention, the fork carrying mast assembly 12 is rotatably and tiltably mounted on the column 20, and the column 20 is mounted for horizontal movement relative to the vehicle chassis 11. For the latter purpose, the column 20 includes a central shaft 40 (see FIG. 4) that is fixed on the end of a beam 41 slidably telescoped in a carrier 42 mounted in the chassis frame 15. Preferably, the carrier 42 and the beam 41 are rectangular in cross section and the carrier is extended substantially the full length of the chassis 11 and formed with an upper, cut-away opening 43. The beam 41 is preferably somewhat shorter than the carrier so that telescoping the beam within the carrier gives the column 20 a range of movement from within the periphery of the chassis 11, suggested by the dashed lines at the right in FIG. 3, to an outwardly extending position, suggested by the dashed lines at the left of FIG. 3. The total range of movement permitted by extension of the beam 41 and retraction of the mast assembly 12 within the opening 43 is preferably greater than the horizontal length of the tines 27. This gives the track 10 its self-loading capability as discussed below. To extend and retract the beam 41 and thus horizontally translate the column 20, an actuator 45 is anchored to a bracket 46 at the rear end of the carrier 42 and the actuator driven element in the form of a rod 47 is secured to the front portion of the beam 41. Supplying fluid under pressure to the actuator 45 horizontally positions the column 20 and, hence, translates the mast assembly 12.

For rotatably mounting the mast assembly 12, the column 20 includes a cylindrical housing 50 fitted over the shaft 40 and supported on bearings 51 and 52 (see FIG. 4). A fluid motor 53 is secured to the upper portion of the housing 50 (see FIG. 2) and drives a worm 54 within the housing 50 that meshes with a worm gear 55 fixed to the top of the shaft 40. Thus, energization of the motor 53 selectively rotates the housing 50 in either direction relative to the shaft 40 and, in this way, swings the mast assembly 12 about an axis defined by the shaft 40. Since the mast channels 22 lie above the level of the deck 21, and the subassembly 25 can be elevated so that the tines 27 also clear the deck 21, full 360° continuous rotation of the mast assembly 12 is possible.

For tiltably mounting the mast assembly 12, the housing 50 is formed with laterally projecting brackets 57 to which lugs 58 on the mast channels 22 are pivoted by pins 59. The housing 50 also carries a lower bracket 61 to which a pair of actuators 62 are anchored. Rods 63, constituting the movable elements of the actuators 62, are pivotally connected to the lower mast brace member 24 so that energization of the actuators 62 is effective to tilt the mast assembly 12 about the horizontal axis defined by the pins 59.

As a feature of the invention, the operator's platform or station 13 is secured to the mast assembly 12 so as to rotate and translate with it. Preferably, the station 13 is mounted at one side of the column 20 (see FIG. 2) so that the latter structure does not obstruct the operator's view of his working area. Moreover, by securing the operator's station to the mast assembly, the operator always faces the load and is immediately adjacent the work. In the illustrated construction, the operator's station 13 includes a seat 70, overhead safety bars 71, steering wheel 72 and a control housing 73 for mounting the valve actuators or control levers, engine controls, indicators and similar devices utilized to operate the truck 10. The specific controls required will obviously be familiar to those skilled in this art.

The advantages and novel capabilities of the truck 10 can now be apprecitaed. In FIG. 1, the conventional fork lift operation of the truck 10 is suggested with the tines 27 being illustrated at floor or ground level in solid lines in position to pick up a palleted load. The load is lifted by energizing the actuator 30, and energization of the actuators 62 tilts the mast assembly so as to more firmly hold the load on the tines 27. The dashed lines at the left of FIG. 1 show a palletized load elevated and tilted on the mast assembly.

In addition, FIG. 1 suggests the ability of the truck 10 to carry a load on its platform or deck 21 in the manner of a conventional truck. The broken lines at the right of FIG. 1 show a load on the platform 21 and it will be evident that the truck 10 can effectively carry a double load, one on the platform 21 and a second on the tines 27 in the manner of a conventional fork lift truck. If a particularly heavy load is to be transported, it can advantageously be carried on the deck 21 so that its weight is proportioned between the wheels 16, 17 rather than moved as an overbalancing weight hung out on the fork.

The truck 10 is self-loading since the load can be placed on the deck 21 by lifting to the position shown in dashed lines at the left of FIG. 1, swinging the entire mast assembly 12 from the solid to the dashed line position shown in FIG. 2 and translating the mast assembly along with the load rearwardly from a solid to the dashed line positions at the right of FIG. 3. When the load is deposited on the deck 21, the actuator 45 is again energized to extend the beam 41, to the dashed line position suggested at the left of FIG. 3, so that the tines 27 clear the load deposited on the deck. The mast assembly 12 is then free to be swung forwardly for further work or transport.

It will also be appreciated that the added reach given the mast assembly 12 by the extensible beam 41 allows work to be done in cramped quarters without movement of the vehicle chassis 11. It can also be seen that by extending the beam 41 from the chassis 11, the mast assembly 12 can be swung to one side or the other with the subassembly 25 lowered so that the tines 27 are at ground or floor level. As shown in FIG. 6, this permits stacking loads at right angles to an aisle having a width W that can be slightly less than the unextended length L of the vehicle 10 with the tines 27 extending forwardly. The positioning operation shown in FIG. 6 is of course accomplished by extending the beam 41 and coordinating swinging movement of the mast assembly 12 with steering of the vehicle wheels.

Those familiar with this art will appreciate that despite the versatility of the truck 10, it is of a compact and basically simple design so as to be well suited for commercial manufacure and well adapted for reliable, heavy duty operation.

We claim as our invention:

1. A load carrying vehicle comprising, in combination, a self-propelled chassis, a column mounted on said chassis for horizontal movement to an outwardly extending position well beyond the periphery of said chassis, a mast mounted on said column for continuous rotation about a vertical axis, a subframe mounted on said mast for up and down sliding movement, a set of lift fork tines extending from the lower end of said subframe, and an operator's platform secured to said mast and extending oppositely from said tines.

2. A load carrying vehicle comprising, in combination, a self-propelled chassis, a flat deck mounted on said chassis, a column mounted on said chassis for movement along said deck from within the periphery of said chassis to an outwardly extending position well beyond the periphery of said chassis, a mast mounted on said column for swinging movement about a vertical axis, a subframe mounted on said mast for up and down sliding movement, a set of lift fork tines extending from the lower end of said subframe, and an operator's platform secured to said mast just above the level of said deck and extending oppositely from said tines.

3. A load carrying vehicle comprising, in combination, a self-propelled chassis, a flat deck mounted on said chassis, a column mounted on said chassis for movement along said deck from within the periphery of said chassis to an outwardly extending position well beyond the periphery of said chassis, a mast mounted of said column for swinging movement about a vertical axis, a subframe mounted on said mast for up and down sliding movement, a set of lift fork tines extending from the lower end of said subframe, means for tilting said mast on said column so as to lift the outer ends of said tines, an operator's platform secured to said mast just above the level of said deck and extending oppositely from said tines, and means controlled from said platform for reciprocating said column, tilting said mast, rotating said mast, and raising and lowering said subframe.

4. A load carry vehicle comprising, in combination, a self-propelled chassis, a flat deck mounted on said chassis, a beam mounted longitudinally of said chassis beneath said deck, a mast mounted on one end of said beam for rotational movement above said deck about a generally vertical axis, means for longitudinally sliding said beam so as to carry said mast to an outwardly extending position well beyond the periphery of said chassis, a subframe mounted on said mast for up and down sliding movement, a set of lift fork tines extending from the lower end of said subframe, and an operator's platform secured to said mast just above the level of said deck and extending oppositely from said tines.

5. A load carrying vehicle comprising, in combination, a self-propelled chassis, a flat deck mounted on said chassis, a beam mounted longitudinally of said chassis beneath said deck, a mast mounted on one end of said beam for rotational movement above said deck about a generally vertical axis, means for longitudinally sliding said beam so as to carry said mast from within the periphery of said chassis to an outwardly extending position well beyond the periphery of said chassis, a subframe mounted on said mast for up and down sliding movement, a set of lift fork tines extending from the lower end of said subframe, means for tilting said mast on said column so as to lift the outer ends of said tines, an operator's platform secured to said mast just above the level of said deck and extending oppositely from said tines, and means controlled from said platform for reciprocating said column, tilting said mast, rotating said mast, and raising and lowering said subframe.

6. In an industrial fork lift truck having steerable wheels at one longitudinal end thereof and a fork carrying mast assembly disposed at the other longitudinal end, the improvement comprising means mounting said assembly for extension longitudinally from the periphery of said other truck end and rotation about a substantially vertical axis well beyond the periphery of said truck so as to permit placement of loads at right angles to the center line of aisles narrower than the unextended length of said truck.

7. In an industrial fork lift truck having steerable wheels at one longitudinal end thereof and a fork carrying most assembly disposed at the other longitudinal end, the combination comprising, means mounting said assembly for extension longitudinally from the periphery of said other truck end and rotation about a substantially vertical axis well beyond the periphery of said truck so as to permit placement of loads at right angles to the center line of aisles narrower than the unextended length of said truck, and an operator's platform mounted on said mast assembly so that the operator travels with and always faces the load.

References Cited by the Examiner

UNITED STATES PATENTS

| 2,823,813 | 2/1958 | Shimmon | 214—75 |
| 2,980,269 | 4/1961 | Zimmerman | 214—75 |
| 3,202,242 | 8/1965 | Dolphin | 214—730 X |

FOREIGN PATENTS 248,860  1/1964  Australia.

GERALD M. FORLENZA, *Primary Examiner.*

R. G. SHERIDAN, *Assistant Examiner.*